United States Patent
Hanke

(10) Patent No.: US 11,378,171 B2
(45) Date of Patent: Jul. 5, 2022

(54) SINGLE SPROCKET

(71) Applicant: SRAM DEUTSCHLAND GmbH, Schweinfurt (DE)

(72) Inventor: Joachim Hanke, Niederwerrn (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 346 days.

(21) Appl. No.: 16/227,208

(22) Filed: Dec. 20, 2018

(65) Prior Publication Data
US 2019/0195331 A1    Jun. 27, 2019

(30) Foreign Application Priority Data

Dec. 22, 2017  (DE) ............... 10 2017 012 035.8

(51) Int. Cl.
*B62M 9/02*    (2006.01)
*B62M 9/10*    (2006.01)
*F16H 55/30*   (2006.01)

(52) U.S. Cl.
CPC ............. *F16H 55/30* (2013.01); *B62M 9/02* (2013.01); *B62M 9/105* (2013.01)

(58) Field of Classification Search
CPC .......... B62M 9/10; B62M 9/105; B62M 9/12; B62M 9/02; B62M 9/04; F16H 55/30
USPC ................................. 474/152, 160
See application file for complete search history.

(56) References Cited

U.S. PATENT DOCUMENTS

| | | | | |
|---|---|---|---|---|
| 6,273,836 B1* | 8/2001 | Thompson | ............... | B62M 9/06 474/160 |
| 9,669,899 B2* | 6/2017 | Barefoot | ................ | F16H 55/30 |
| 2007/0054768 A1* | 3/2007 | Miyazawa | ............. | F16H 55/30 474/152 |
| 2008/0176691 A1* | 7/2008 | Saifuddin | ............. | B62M 9/105 474/160 |
| 2013/0184110 A1* | 7/2013 | Reiter | ..................... | F16H 55/30 474/152 |
| 2014/0364259 A1* | 12/2014 | Reiter | ..................... | B62M 9/10 474/155 |
| 2015/0094179 A1* | 4/2015 | Iwai | ........................ | F16H 55/30 474/152 |
| 2015/0198231 A1* | 7/2015 | Emura | ..................... | F16H 7/06 474/156 |
| 2015/0226306 A1* | 8/2015 | Pfeiffer | ................. | B62M 9/105 474/152 |
| 2015/0226308 A1* | 8/2015 | Pfeiffer | ................... | B62M 9/10 474/152 |
| 2015/0285362 A1* | 10/2015 | Pfeiffer | .................... | B62M 9/10 474/152 |

(Continued)

FOREIGN PATENT DOCUMENTS

DE    102018110788    12/2018
EP    1652767    5/2006

*Primary Examiner* — Michael R Mansen
*Assistant Examiner* — Raveen J Dias

(57) ABSTRACT

A single sprocket for mounting on a pedal crank of a bicycle is provided. The sprocket h is mounted rotatably about an axis of rotation of a bicycle, and for engaging in a bicycle chain with chain inner link plate pairs and chain outer link plate pairs. The sprocket includes an axial outer side, an axial inner side, a hub region, a tooth region and a connecting region. A tooth center plane of the sprocket is offset inwards in the axial direction with respect to a hub center plane.

9 Claims, 13 Drawing Sheets

(56) References Cited

U.S. PATENT DOCUMENTS

| | | | | |
|---|---|---|---|---|
| 2015/0285363 A1* | 10/2015 | Pfeiffer | ............... | F16H 55/30 |
| | | | | 474/152 |
| 2015/0285364 A1* | 10/2015 | Pfeiffer | ............... | B62M 9/10 |
| | | | | 474/152 |
| 2015/0337943 A1* | 11/2015 | Sugimoto | ............ | B62M 9/00 |
| | | | | 474/152 |
| 2016/0208903 A1* | 7/2016 | Goates | ............... | B62M 9/105 |
| 2016/0298752 A1* | 10/2016 | Winans | ............... | B62M 9/00 |
| 2016/0347409 A1* | 12/2016 | Watarai | ............... | B62M 9/02 |
| 2016/0368561 A1* | 12/2016 | Kamada | ............... | B62M 3/00 |
| 2017/0247081 A1* | 8/2017 | Sugimoto | ............ | F16H 55/30 |
| 2017/0292598 A1* | 10/2017 | Moore | ............... | B62M 9/105 |
| 2017/0355422 A1* | 12/2017 | Sugimoto | ............ | B62M 9/12 |
| 2017/0370460 A1* | 12/2017 | Akanishi | ............ | F16H 55/30 |
| 2017/0370462 A1* | 12/2017 | Akanishi | ............ | F16H 55/303 |
| 2018/0079467 A1* | 3/2018 | Hirose | ............... | B62M 9/105 |
| 2018/0127057 A1* | 5/2018 | Sugimoto | ............ | B62M 1/36 |
| 2018/0134340 A1* | 5/2018 | Emura | ............... | F16H 55/30 |
| 2018/0141615 A1* | 5/2018 | Sugimoto | ............ | B62M 9/12 |
| 2018/0180157 A1* | 6/2018 | Akanishi | ............ | B62M 9/12 |
| 2018/0202531 A1* | 7/2018 | Ooishi | ............... | F16H 55/30 |
| 2018/0299004 A1* | 10/2018 | Ohno | ............... | B62M 9/10 |
| 2018/0347680 A1* | 12/2018 | Akanishi | ............ | F16H 55/30 |
| 2019/0291818 A1* | 9/2019 | Braedt | ............... | B62M 1/36 |
| 2020/0040979 A1* | 2/2020 | Akanishi | ............ | B62M 9/00 |
| 2020/0256446 A1* | 8/2020 | Klawer | ............... | F16H 55/30 |

* cited by examiner

SINGLE SPROCKET

This application claims priority to, and/or the benefit of, German patent application DE 10 2017 012 035.8, filed on Dec. 22, 2017, the contents of which are herein referenced in their entirety.

FIELD OF THE INVENTION

The invention relates to a single sprocket drive system, and specifically to a single sprocket drive system for a bicycle.

BACKGROUND

Chain drives in bicycles already have a long development history. In accordance with changing requirements, different requirements will have to be met again.

The starting point was an input chain drive with a single sprocket (front sprocket) on the pedal crank in combination with a single pinion (rear sprocket) on the hub on the rear wheel, wherein front and rear sprockets were coupled by means of a roller-type chain.

This concept has basically been retained in the case of multi-speed drives having change-over devices for transferring the roller-type chain (front derailleur and rear gear shift mechanism) between adjacent sprockets. The change-over devices have been supplemented by chain-tensioning devices. The requirements for secure engagement of the roller-type chain on the teeth of the sprockets increased as a result of the chain skew between the plurality of front sprockets arranged axially next to one another, on the one hand, and rear sprockets, on the other hand.

In conjunction with the introduction and development of mountain bikes (MTB), the number of front sprockets has been extended to up to three. The chain skew has increased correspondingly here.

In recent times, chain drives have been modified to the effect that they only have a single front sprocket (individual chain ring or sprocket). For this purpose, detailed solutions have been used, such as a tooth geometry with alternating thick and thin teeth, which also manages without an existing chain guide of a front derailleur and permits very secure engagement of the roller-type chain on the front sprocket.

In order to achieve a spreading of the available gears, use is made of multiple pinion arrangements having a large number of 11, 12 or 13 pinions. Use is made of very large pinions having around 50 teeth which take up the construction space available between the inner hub flange and the outer rim as a result of the inclined extent of the spokes. In comparison to other arrangements, the large pinions of said multiple pinion arrangement are arranged a good distance on the inside—in the direction of the hub center or frame center.

For an ideal chain line, the front individual chain ring and the pinion are located on the same geometrical plane, and therefore the chain does not experience any skew. In this ideal state, there would be minimal chain wear and maximum efficiency of the drive train. However, this state is not produced for every pinion of the multiple pinion arrangement. The chain skew is particularly large on the smallest and largest pinions.

The small pinions of the multiple pinion arrangement are arranged axially further on the outside than the large pinions. The large pinions are arranged axially further on the inside than the small pinions. In the radial direction, the teeth are arranged on the outside on the pinion and on the sprocket. The profile for transmitting torque is arranged radially on the inside on the pinion and/or on the sprocket.

In comparison to the large sprockets which are present in multiple arrangements, the front individual sprockets are comparatively small and therefore relatively stable. However, this advantage in terms of stability is opposed by relatively large chain tensile forces which may arise as a result of the changed transmission ratio between maintained crank length and reduced sprocket diameter.

In the event of insufficient rigidity of the sprocket, such as, for example, when very high chain tensile forces are applied, the sprocket can buckle laterally and is destroyed in the process. This problem is intensified if the chain skew is increased, for example due to an axial shifting of the largest pinions axially inwards, towards the spokes of the rear running wheel when increasing the number of pinions. The chain tensile forces on account of the high chain skew are particularly large if the chain is in engagement with one of the large pinions located further on the inside. The risk of the chain ring buckling is at the greatest here.

SUMMARY AND DESCRIPTION

A single sprocket for mounting on a pedal crank, which is mounted rotatably about an axis of rotation of a bicycle, and for engaging in a bicycle chain with chain inner link plate pairs and chain outer link plate pairs is provided. The single sprocket includes an axial outer side and an axial inner side. The single sprocket also includes a hub region with an inner profile at a radially inner end of the sprocket for transmitting torque from the pedal crank to the sprocket, the hub region defining an axial hub center plane between a hub outer plane and a hub inner plane. The single sprocket also includes a tooth region with a plurality of teeth at a radially outer end of the sprocket for engaging in the bicycle chain, the tooth region defining an axial tooth center plane between a tooth outer plane and a tooth inner plane, the tooth inner plane defined by surfaces lying furthermost on the inside in an axial direction of the plurality of teeth. The single sprocket also includes a connecting region which extends in a radial direction between the hub region and the tooth region of the sprocket and connects said regions to each other, the connecting region defining a connecting center plane between a connecting outer plane and a connecting inner plane, and the connecting inner plane defined by surfaces lying furthermost on the inside in the axial direction of the connecting region. A tooth center plane is offset inwards in the axial direction with respect to the hub center plane, and the connecting inner plane of the connecting region is offset inwards in the axial direction with respect to the tooth inner plane of the tooth region.

BRIEF DESCRIPTION OF THE DRAWINGS

FIG. 11c shows a perspective outer view of a partial detail

DETAILED DESCRIPTION OF THE DRAWINGS

Figure 1:
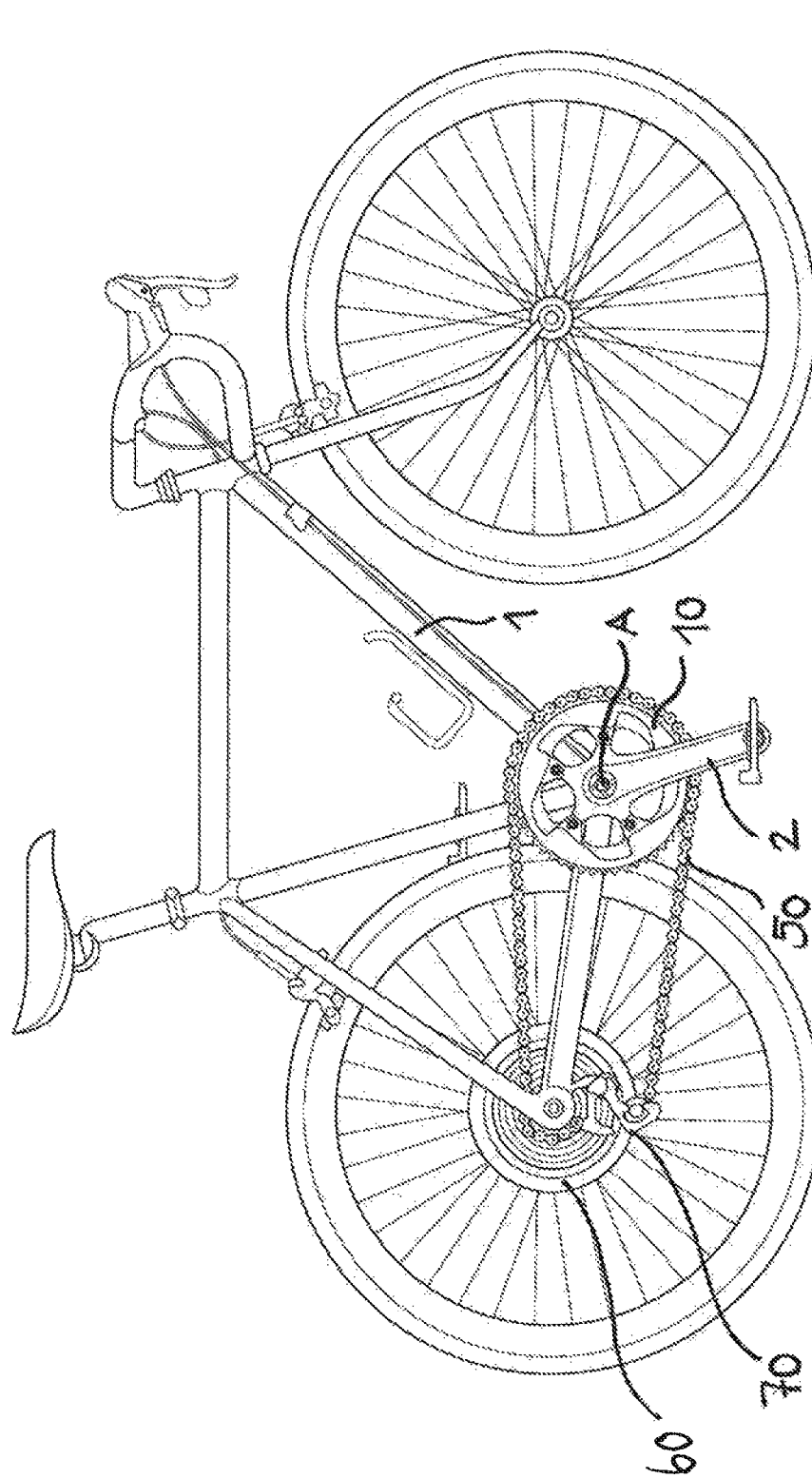
FIG. 1 shows a side view of a bicycle

In the design of the chain rings, it is important to take into consideration the increased stability requirements and secondly the requirements for light weight which now exist. The selection of material (weight and strength) and also the geometry (rigidity) are of importance here.

At the teeth of the sprocket in the tooth center plane, the chain tensile force is introduced into the teeth, wherein the direction of the chain tensile force on account of the chain skew with respect to a rear pinion of a multiple pinion set is not parallel to the tooth center plane.

Firstly, the tooth center plane of the sprocket is intended to be arranged as centrally as possible with respect to the multiple pinion set in order to restrict the chain skew. Secondly, the hub region of the sprocket cannot be freely varied because of predetermined frame and crank connection extents. This leads to the sprocket having an offset in the axial direction between its hub center plane and its tooth center plane. In particular, the tooth center plane is offset inwards relative to the hub center plane.

In the case of known sprockets (previous SRAM sprockets), there is an axial offset between the tooth center plane and the center plane through the radially inner hub region (hub center plane) of the sprocket. This offset inevitably arises because other structural sizes are predetermined (standard) and the modifications are implemented on the sprocket under various connection conditions. Firstly, a standardized size for the concrete axial stop on the crank for the sprocket can be maintained and secondly can correspond despite different sizes for the chain line. The selected offset depends on a plurality of factors, such as the multiple pinion arrangement used, the axial positioning thereof in relation to the chain ring, the frame sizes, the hub width and the crank standard used.

This offset in the axial direction between the tooth center plane and the hub center plane further increases the susceptibility of the sprocket to buckling.

The requirements imposed on the stability of the sprocket are further increased with the increase in the number of teeth and therefore the increase in the sprocket diameter because of the increasing lever.

It is the object to provide a sprocket which meets the requirements mentioned. The sprocket is intended to have sufficient stability, low weight and good chain-guiding properties and also take into consideration the predetermined construction space.

This object is achieved by a single sprocket according to Claim 1.

The single sprocket is suitable for mounting on a pedal crank, which is mounted rotatably about an axis of rotation, of a bicycle, and for engaging in a bicycle chain with chain inner link plate pairs and chain outer link plate pairs. The sprocket has an axial outer side and an axial inner side. Furthermore, the sprocket has a hub region with an inner profile at the radially inner end of the sprocket for transmitting torque from the pedal crank to the sprocket.

The hub region defines an axial hub center plane between a hub outer plane and a hub inner plane. The sprocket furthermore has a tooth region with a plurality of teeth at a radially outer end of the sprocket for engaging in the bicycle chain. The tooth region defines an axial tooth center plane between a tooth outer plane and a tooth inner plane. The tooth inner plane is defined by the surfaces, lying furthermost on the inside in the axial direction, of the plurality of teeth. Furthermore, the sprocket has a connecting region which extends in the radial direction between the hub region and the tooth region of the sprocket and connects said regions to each other. The connecting region defines a connecting center plane between a connecting outer plane and a connecting inner plane. The connecting inner plane is defined by the surfaces, lying furthermost on the inside in the axial direction, of the connecting region. The tooth center plane runs in a manner offset inwards in the axial direction with respect to the hub center plane, wherein, in order to increase the rigidity of the sprocket, the connecting inner plane of the connecting region runs in a manner offset inwards in the axial direction with respect to the tooth inner plane of the tooth region.

It has been shown that the stability of the sprocket can be noticeably increased if the connecting inner plane is dimensioned on one side to be larger axially inwards in order to increase the supporting cross section in the connecting region. Specifically if the connecting inner plane runs axially within the tooth inner plane, i.e. the cross section of the connecting region reaches in the axial direction to over the tooth inner plane, the rigidity is particularly high.

According to one embodiment of the sprocket, the connecting region is formed by a plurality of arms. The plurality of arms extend from the hub region to the tooth region and connect said regions to each other.

The connecting region could also be formed closed or closed with apertures. The embodiment with a plurality of arms without material between the arms is particularly light in weight.

In particular, the arrangement of arms in the connecting region of the sprocket outside the dead centers of the crank arrangement has proven effective. In the regions of the chain ring, at which high forces are transmitted from the crank via the sprocket to the chain, the chain ring has to be of particularly stable design. The arms are arranged here. The less loaded regions of the chain ring in the two dead centers of the crank arrangement can remain free from arms. Further weight can thereby be saved.

According to one embodiment of the sprocket, the arms are designed in cross section in the shape of a profile carrier. In particular, the arms have a thin-walled open cross section 42. The wall thickness or material thickness of the cross section is small relative to the axial width of the connecting region. Cross section means the profile of the arms. Said profile is intended primarily to be of thin-walled design. The form which the profile has is of secondary importance.

According to one embodiment, the cross section of the arms is of substantially U-shaped design. The U-shaped profile in particular has a first and second profile wall and a profile base, the material thickness of which is small in comparison to the axial width of the connecting region.

According to one embodiment, the U-shaped cross section is open towards the outer side of the sprocket and closed towards the inner side of the sprocket. The closed profile base of the cross section at the same time forms the overhang beyond the tooth inner plane on the inner side of the chain ring.

The thin-walled open cross section of the connecting region firstly permits simple manufacturing by milling, and, secondly, the ratio of increased profile width and small material thickness ensures a uniformly stable and also lightweight design.

According to one embodiment of the sprocket, the plurality of teeth comprise a first group of teeth and a second group of teeth.

In particular, the first group of teeth has a first axial width and the second group of teeth has a second axial width. The second axial width is greater than the first axial width. In particular, the first axial width of the first group of teeth is smaller than a chain inner link plate spacing of a chain inner link plate pair. The second axial width of the second group of teeth is greater than the chain inner link plate spacing and smaller than an outer link plate spacing of an outer link plate pair. The thick and thin teeth improve the guiding of the chain.

According to one embodiment, the teeth of the second group of teeth in each case have an axial projection which extends in the radial direction from the tooth tip over the tooth root and up to and beyond the root diameter. The elongate design of the projection in the radial direction provides the tooth with more stability.

The root is an imaginary line running tangentially with respect to the tooth base.

According to one embodiment of the sprocket, the projection on the teeth of the second group of teeth is in each case formed on the outer side and/or on the inner side. That is to say, either a projection is formed on the axial outer side of the tooth, or on the axial inner side of the tooth, or on both sides of the tooth.

The projections can be produced either by material abrasion in the remaining regions, or by material application in the region of the projections.

According to one embodiment of the sprocket, the teeth of the first group in the radial direction are shorter than the teeth of the second group. Conversely, the teeth of the second group are longer than the teeth of the first group.

In particular, the teeth of the second group are larger both in the axial direction and in the radial direction than the teeth of the second group. The embodiment ensures particularly good guiding of the chain, as is necessary in the event of a pronounced chain skew.

The directional details front and rear used below relate to a bicycle in the direction of travel. Axially on the outside and axially on the inside relate to the outer side and inner side of the chain ring in its orientation provided for installation. The outer side of a chain ring mounted on the front right pedal crank faces outwards, i.e. away from the frame. The inner side of the chain ring faces inwards, i.e. towards the frame. Axially relates to the axis of rotation A of the chain ring or of the entire pedal crank arrangement. The teeth are arranged radially on the outside on the chain ring. The outer diameter of the chain ring is the radially outer end. The inner diameter is the radially inner end of the chain ring. The FIG.s show views on different scales.

FIG. 1 shows by way of example a other bicycle with a bicycle frame 1 and a bicycle drive including of a front chain ring 10, which is mounted on the right bicycle crank 2, a multiple pinion arrangement 60 and a bicycle chain 50. The front pedal crank arrangement, including of the chain ring 10 and the pedal crank 2, rotates about the axis of rotation A. The multiple pinion arrangement 60 comprises an increased number of adjacent pinions, in particular twelve pinions, which are illustrated schematically here. The bicycle chain 50 is in engagement with the teeth of the chain ring 10 and the teeth of one of the pinions of the multiple pinion arrangement 60. Force is transmitted by means of the bicycle chain 50 from the front pedal crank arrangement to the rear multiple pinion arrangement 60 and from there via the driver to the rear wheel hub. The gear shift mechanism 70 can be activated either mechanically or electrically. The illustration in FIG. 1 is intended to clarify the assignment of the parts. Other embodiments of the invention may differ from the schematically shown sprocket 10.

The chain ring according to the invention is not only suitable for a racing bike (illustrated), but may also be used on a plurality of types of bicycle, such as mountain bikes, touring bikes or E bikes. Depending on the type of drive, chain rings with different numbers of teeth than those illustrated in the FIG.s below are also possible. In particular individual chain rings having 30, 32, 34, 36 or 38 teeth are customary embodiments. For a drive having only one front chain ring and thirteen rear pinions, in particular nine, ten or eleven teeth on the smallest pinion and 36 teeth on the largest pinion are possible.

Drives for mountain bikes customarily have an even greater spread of the pinions. In the case of pinion arrangements having twelve pinions, ten teeth on the smallest pinion and 50 teeth on the largest pinion or eleven teeth on the smallest pinion and 55 teeth on the largest pinion are a meaningful spread.

Figure 2:
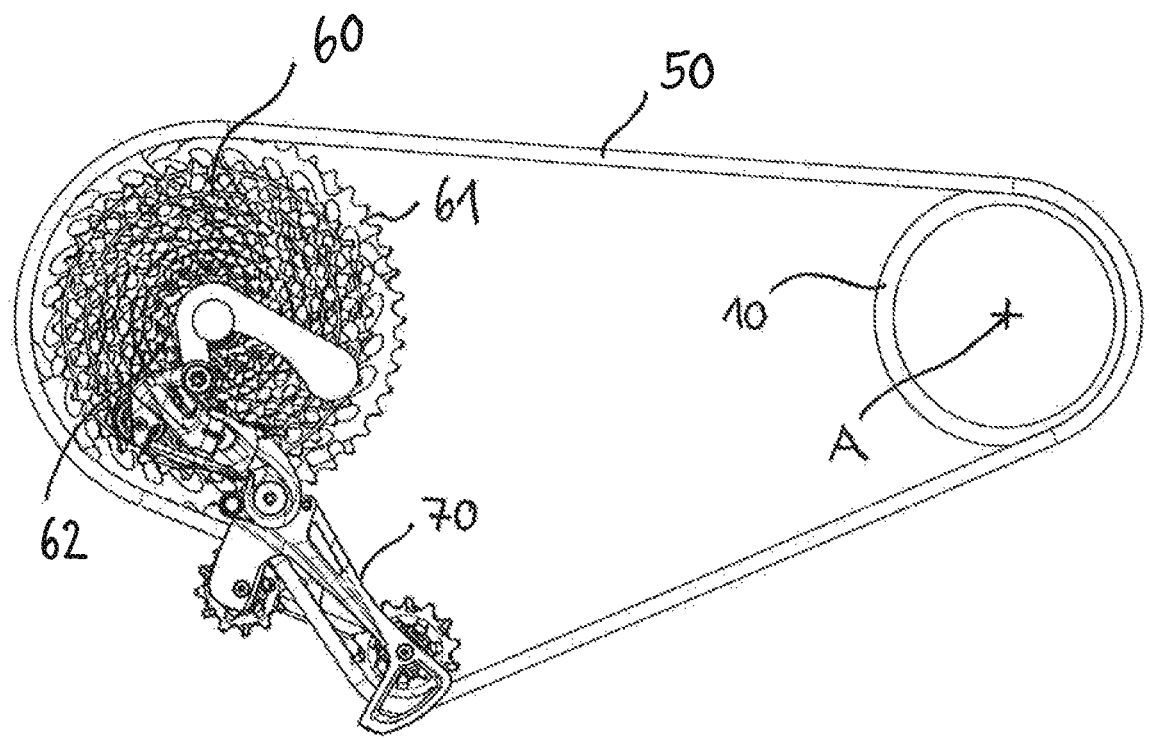
FIG. 2 shows a schematic illustration of a bicycle drive

FIG. 2 shows a schematic illustration of a bicycle drive. The front chain ring arrangement comprises an individual chain ring 10 which rotates about an axis of rotation A. The multiple pinion arrangement 60 comprises twelve pinions with a largest pinion 61 having 50 teeth and a smallest pinion 62 having 10 teeth. In the state shown, the bicycle chain 50 is in engagement with the teeth of the chain ring 10 and with the teeth of the largest pinion 62 of the multiple pinion arrangement 60. The gearshift mechanism 70 moves the bicycle chain 50 during the shifting from one pinion onto an adjacent pinion. The shifting mechanism can be operated here either mechanically or electrically. In the exemplary embodiment shown with only one chain ring 10, the front derailleur is omitted.

Figure 3:
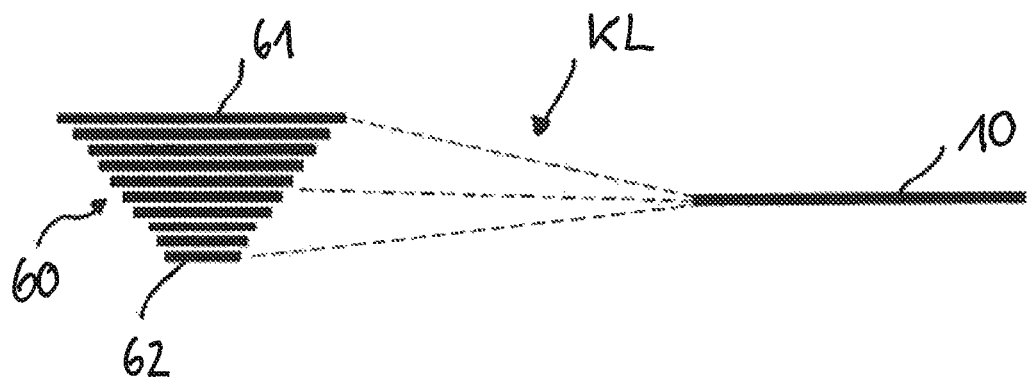
FIG. 3 shows a schematic illustration of the chain line

FIG. 3 shows a further schematic illustration of a bicycle drive for clarifying the various chain lines KL. The chain ring 10 is oriented in relation to the multiple pinion arrangement 60 in such a manner that there is a neutral course of the chain line KL when the chain is in engagement with one of the middle pinions. The neutral chain line corresponds to the ideal course of the chain, in which virtually no chain skew occurs—see central KL. If the chain is located on the smallest pinion 62 or largest pinions 61, the chain skew is correspondingly at the greatest. For this case, the chain ring 10 has to be of sufficiently stiff design in order to be able to absorb the chain forces. The sprocket 10 according to an embodiment can especially well absorb the forces caused by the chain skew on the largest pinion 61.

Figure 4:
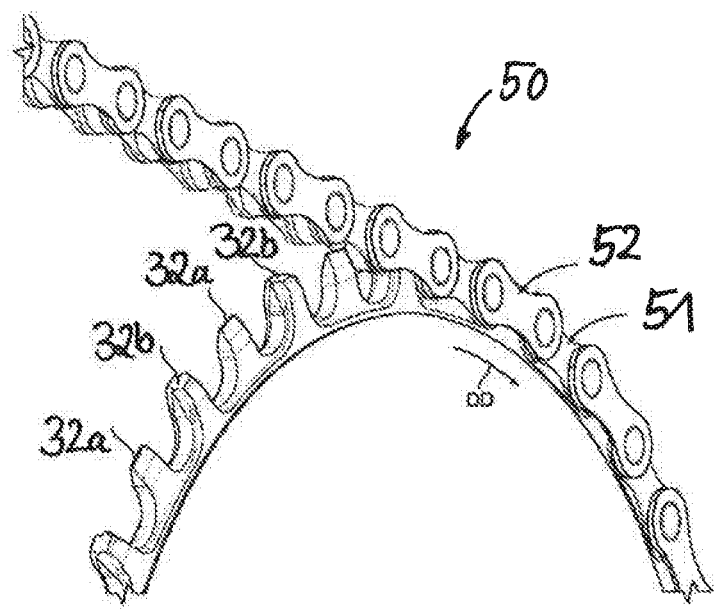
FIG. 4 shows a schematic illustration of a sprocket engaging in or on a chain

FIG. 4 shows a roller-type chain 50 which is in engagement with a sprocket 10 and has chain inner link plate pairs 51 and chain outer link plate pairs 52. The alternating thin and thick teeth 32a, 32b of the chain ring 10 constitute an already known solution for improving the guidance of the chain. The sprocket 10 is rotating in the driving direction DD.

Figure 5:
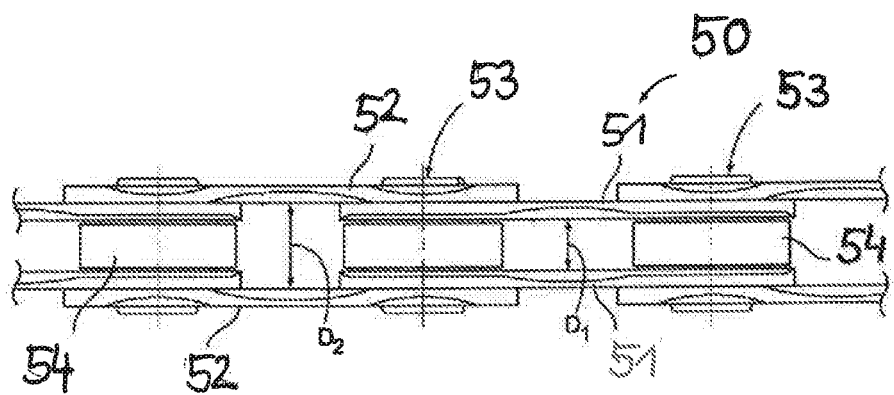
FIG. 5 shows a top view of a chain

The chain 50 which is illustrated in top view in FIG. 5 includes chain inner link plates and chain outer link plates. Each two opposite inner link plates or outer link plates form an inner link plate pair 51 or outer link plate pair 52. The inner link plates and outer link plates are connected in alternation to chain pins 53 in an articulated manner. Chain rollers 54 are mounted rotatably on the collars of the inner link plates. The chain inner link plates of a chain inner link plate pair 51 are arranged at an axial spacing D1 to each other. The chain outer link plates of a chain outer link plate pair 52 are arranged at an axial spacing D2 from each other. The spacing D2 between the chain outer link plates is greater here than the spacing D1 between the chain inner link plates. Said spacings D1 and D2 define the engagement space for the teeth 32 of the sprocket 10. In order to permit neat engagement in the chain 50, the axial widths of the teeth 32 of the sprocket 10 be coordinated with the spacings D1 and D2. For example, D1 is 2.16 mm and D2 is 3.65 mm.

Figure 6A:
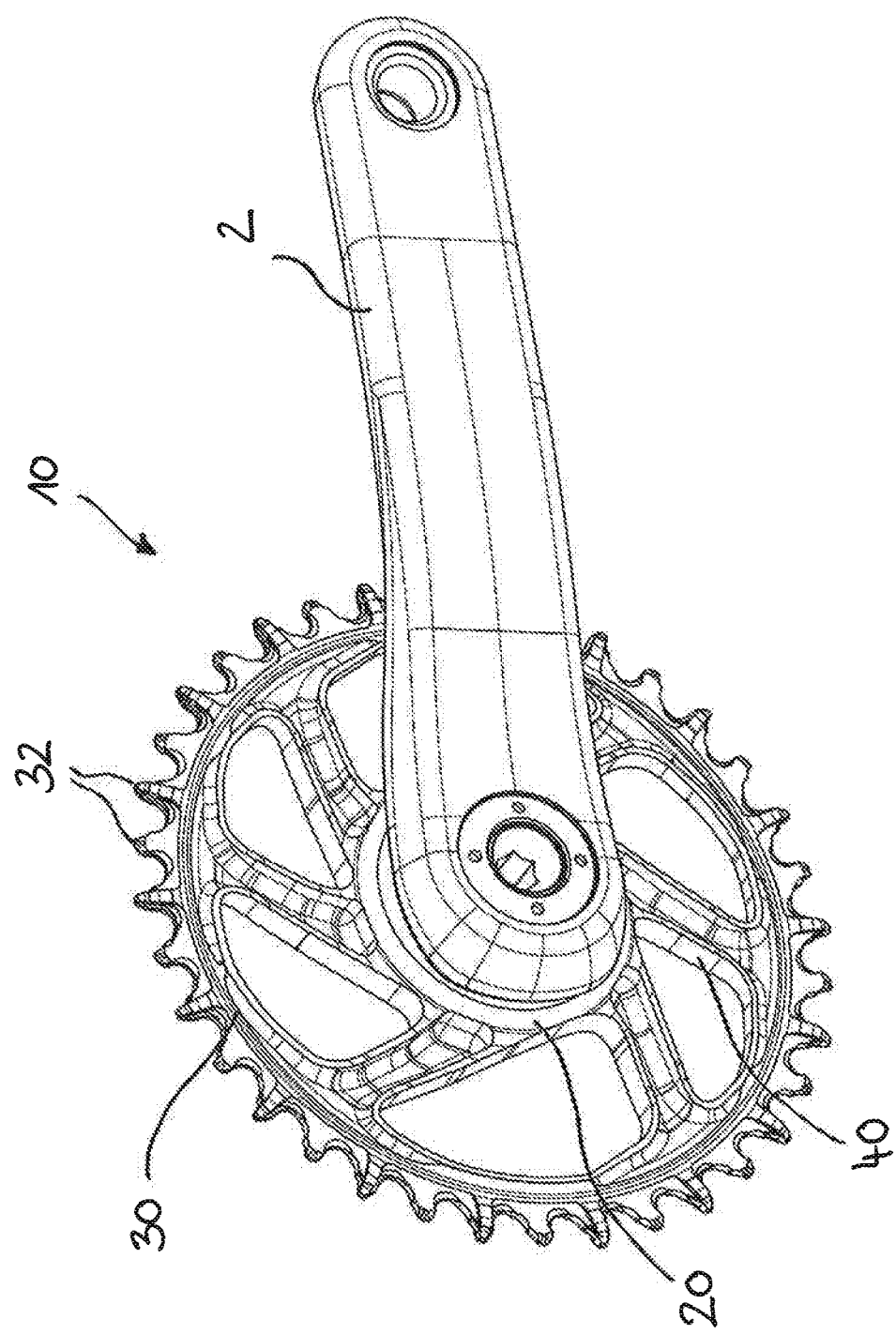
FIG. 6a shows a perspective outer view of the individual chain ring mounted on the pedal crank

FIG. 6a shows a perspective outer view of an embodiment of an individual chain ring 10 mounted on the right pedal crank 2. The chain ring 10 has a hub region 20 on its radial inner region, and a tooth region 30 having a plurality of teeth 32 on its radial outer region. The connecting region 40 extends between the hub region 20 and the tooth region 30. The chain ring 10 therefore includes a hub region 20, a connecting region 40 and a tooth region 30, as seen in the radial direction.

Figure 6B:
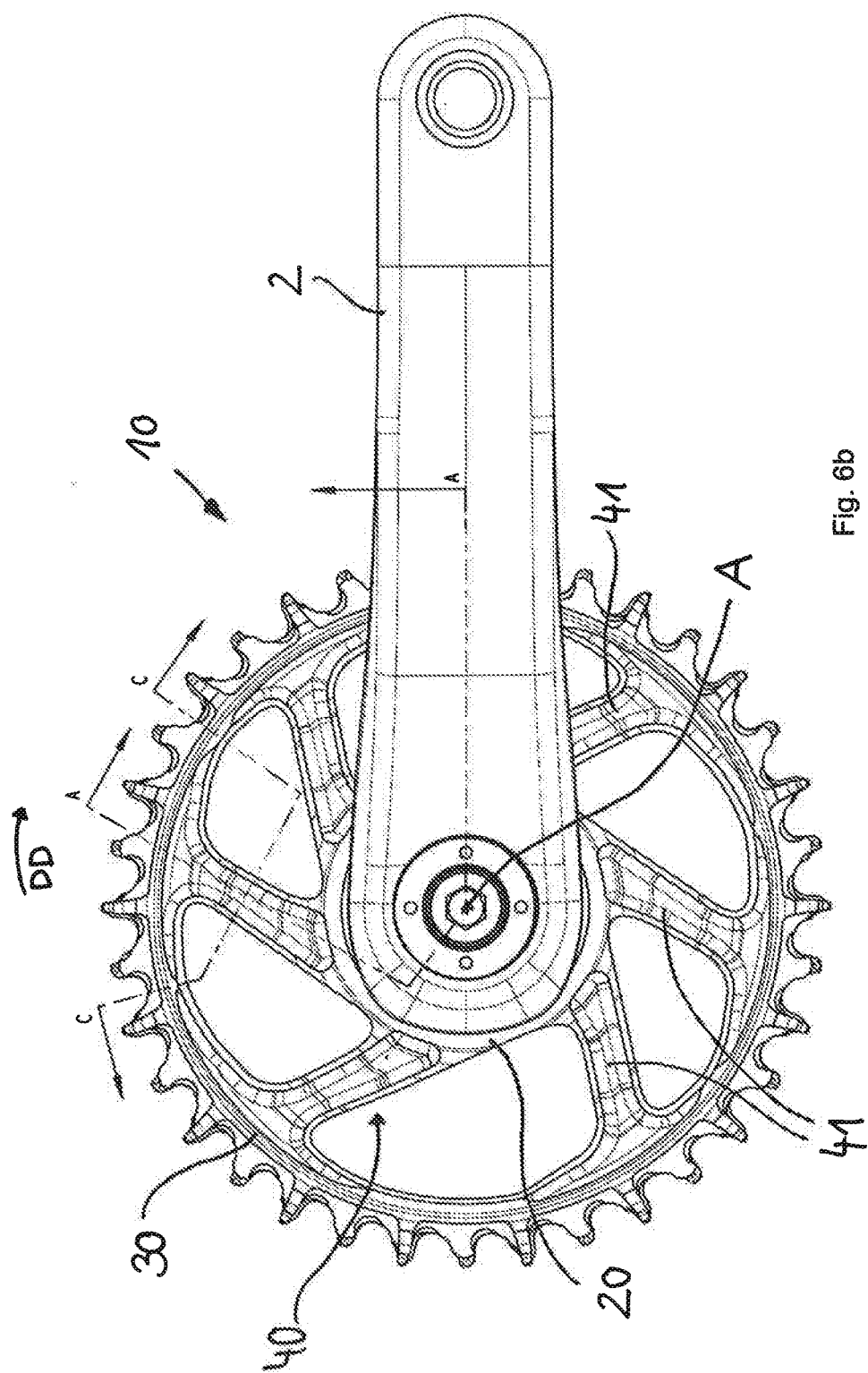
FIG. 6b shows an outer view of the individual chain ring mounted on the pedal crank

From the outer view of the pedal crank arrangement in FIG. 6b it becomes clear that the connecting region 40 of this embodiment comprises a number of six arms 41. The crank arrangement including of the crank 2 and the chain ring 10 is rotating about the axis of rotation A in the driving direction DD. The arms 41 in the connecting region 40 are arranged relative to the pedal crank 2 in such a manner that the upper and lower dead centers of the crank arrangement are taken into consideration. The connecting region 40 is free from arms 41 in the regions of the dead centers because minimal force is transmitted here from the crank 2 to the chain ring 10. The configuration of the chain ring 10 can be correspondingly open and lightweight in said regions. In the regions outside the dead centers, in which the pedal force acting on the crank 2 is high, the chain ring 10, in particular the connecting region 40, has to be of correspondingly stable design. Every three arms 41 are arranged outside the dead centers in these two regions. The arrangement shown of six arms 41 has proven to be a particularly stable and simultaneously lightweight design. The pedal force is transmitted via the pedal crank 2 to the hub region 20 of the chain ring 10. The force is transmitted from here via the arms 41 to the tooth region 20 and further to a chain (not shown here). The sections along the lines A-A and C-C which are shown will be discussed below.

Figure 7:
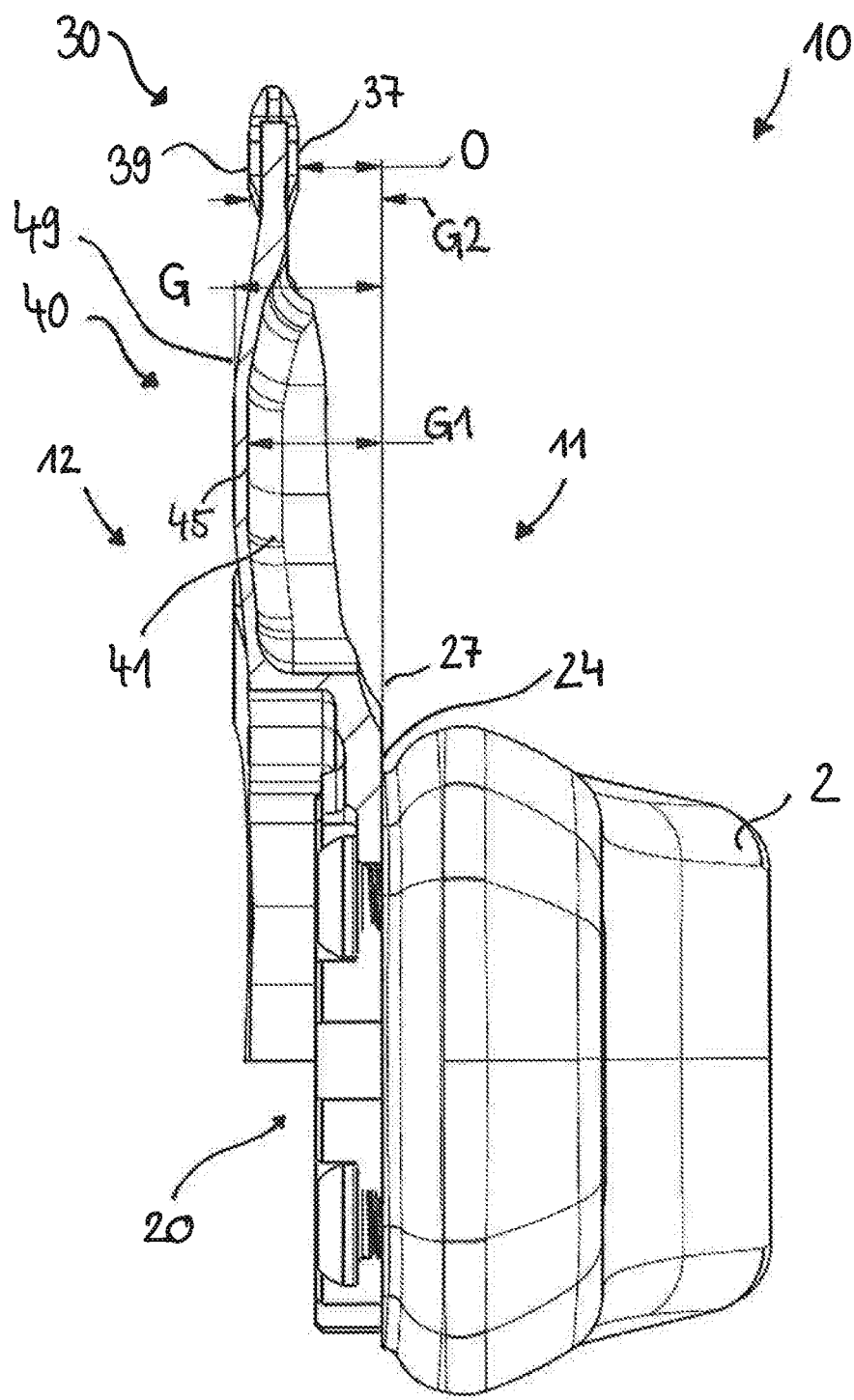
FIG. 7 shows an enlarged sectional illustration A-A from FIG. 6b

FIG. 7 shows an enlarged sectional illustration through the pedal crank arrangement from FIG. 6b along the line A-A. The arrangement of the regions 20, 30, 40 of the chain ring 10 in the axial direction will become clear here. The chain ring 10 has an outer side 11, which faces in the direction of the crank 2, and an inner side 12 lying opposite said outer side. The regions 20, 30, 40 each have an axial inner plane 29, 39, 49 on the inner side 12 of the chain ring 10, an axial outer plane 27, 37, 47 on the outer side 11 of the chain ring 10 and an axial center plane 28, 38, 48 lying inbetween. The inner planes 29, 39, 49 are each defined by those surfaces of the respective region 20, 30, 40 that lie furthermost on the inside in the axial direction. The outer planes 27, 37, 47 are each defined by those surfaces of the respective region 20, 30, 40 that lie furthermost on the outside in the axial direction. The corresponding center planes 28, 38, 48 each lay centrally inbetween (also see FIG. 9). The tooth region 30 is offset inwards in relation to the hub region 20 by a varying offset extent O (axial offset or also called offset). The extent O of the axial offset is, for example, 6.15 mm, as measured from the tooth outer plane 37 as far as the hub outer plane 27 on the outer side 11 of the sprocket 10.

The axial overall width G of the chain ring 10 is measured from the hub outer plane 27 as far as the connecting inner plane 49 and corresponds to the maximum width of the chain ring 10. The overall width G is, for example, 10.9 mm. In order to save weight, the material thickness of the profiled arm 41 is selected to be as small as possible. The axial width G1—as measured from the hub outer plane 27 as far as the profile base 45 of the arm 41—is, for example, 9.9 mm. That is to say, the material thickness of the arm 41 on the profile base 45 is only 1 mm, which is very small in comparison to the overall width G. The axial width G2, as measured from the hub outer plane 27 as far as the tooth inner plane 39, is smaller than the axial overall width G. The axial width G is, for example, 9.75 mm. It therefore follows that the connecting inner plane 49 runs axially further on the inside than the tooth inner plane 39. In other words, the connecting region 40 hangs in the axial direction inwards over the tooth region 30. In this example case, the axial overhang Ü inwards is 1.15 mm (10.9 mm minus 9.75 mm)—also see FIG. 9. The hub outer plane 27 runs through the stop surface 24 of the hub region 20 for the crank 2.

Figure 8A:
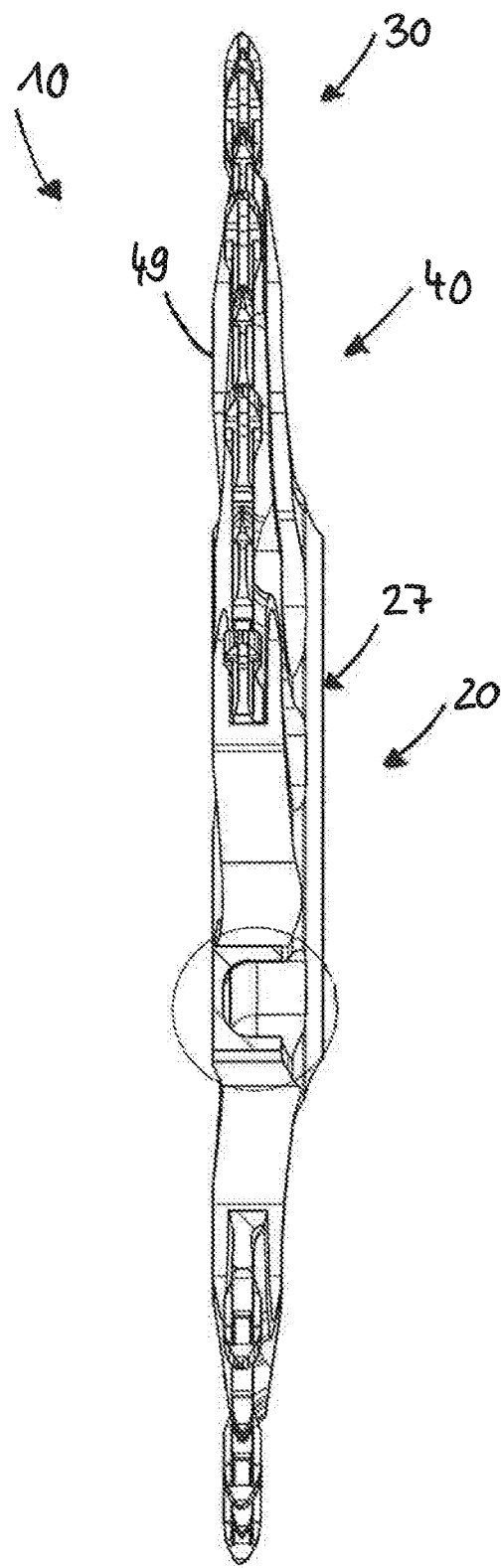
FIG. 8a shows an enlarged sectional illustration C-C from FIG. 6b
Figure 8B:
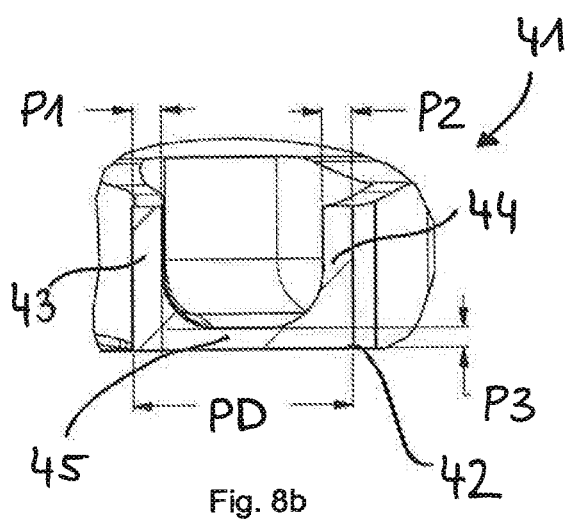
FIG. 8b shows a detail from the sectional illustration from FIG. 8a FIG. 9 shows an enlarged sectional illustration through a sprocket arrangement from FIG. 6b

FIG. 8a shows an enlarged sectional illustration through the pedal crank arrangement from FIG. 6b along the line C-C. The encircled detail shows a cross section through the profiled arm 41 and is illustrated in enlarged form in FIG. 8b.

With these illustrations, the ratio between the comparatively large axial overall width G of the chain ring 10, as measured from the hub outer plane 27 as far as the connecting inner plane 39, and the comparatively small material thickness of the arm profile 42 becomes clear. The arm 41 has a thin-walled, U-shaped profile 42. The profile 42 has a first and second profile wall 43, 44, which are connected to a profile base 45. The material thickness P1, P2 of the profile walls 43, 44 and the material thickness P3 of the profile base 45 are approximately identical in size. For example, the material thickness of the profile 42 could be approximately 1 mm to 1.5 mm. This is small in comparison to the overall width G of approximately 10.9 mm. Also in comparison to the maximum profile width VB of the arm profile 42 in the connecting region 40, as measured from the connecting inner plane 49 as far as the connecting outer plane 47, the material thickness of the arm profile 42 is small—cf. in this respect FIG. 9.

The profile width VB of the arm 41 decreases in the direction of the outer ring 31 of the tooth region 30. On account of the relatively large lever arm or the larger spacing from the tooth region 30 where the chain forces act, the cross section of the arms 41 has to be larger in the direction of the hub region 20 than in the direction of the tooth region 30. In addition, the profiled arms 41 act as pressure rods in the driving direction DD. The profile thickness PD of the arm 41 is correspondingly conFIG.d to the rigidity requirements in the driving direction.

Figure 9:
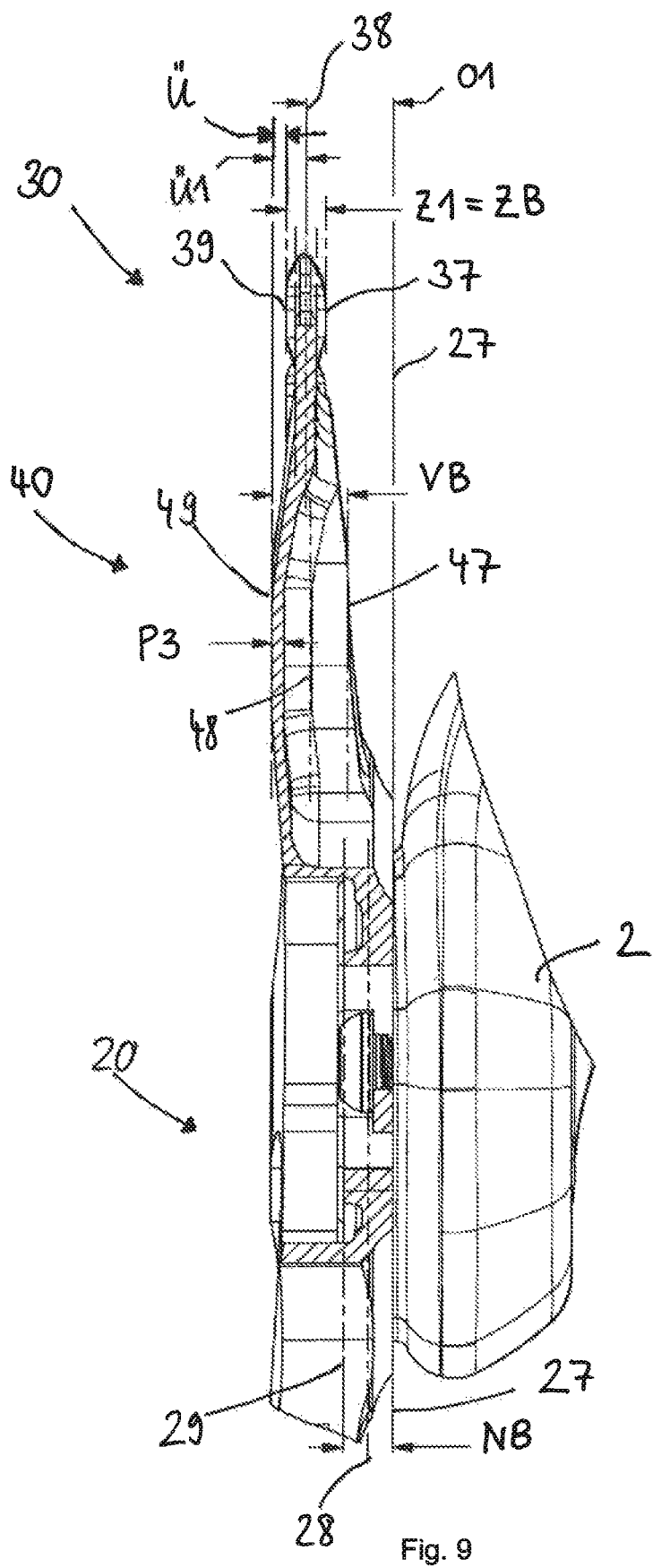

FIG. 9 shows a further section through the crank arrangement from FIG. 6b. The respective maximum axial widths NB, VB, ZB, as measured from the respective inner plane 29, 39, 49 to the respective outer plane 27, 37, 47, are shown here, inter alia, for the regions 20, 30, 40. The center planes 28, 38, 48 are also shown between the respective inner and outer planes in the form of dashed lines. The hub outer plane 27 lies further on the outside in the axial direction A than the connecting outer plane 47 and the tooth outer plane 37. The connecting outer plane 47 lies axially further on the outside than the tooth outer plane 37. The hub inner plane 29 lies further on the outside in the axial direction A than the tooth inner plane 39 and the connecting inner plane 49. However, the connecting inner plane 49 lies axially further on the inside than the tooth inner plane 39. This produces the axial overhang Ü in the connecting region 40. The overhang is shown as Ü1, as measured from the connecting inner plane 49 to the tooth center plane 38.

The tooth center plane 38 and the connecting center plane 48 lie closely next to each other. The skew in both axial directions—both on the smallest pinion 62 to the outside and on the largest pinion 61 to the inside—can be absorbed in a more balanced manner the closer the center planes 38, 48 lie together. Compare the skew in FIG. 3. Depending on the direction in which the center planes 38, 48 are offset with respect to each other, the skew can be absorbed more in the one or other axial direction. In the case shown, the connecting center plane 48 runs slightly offset axially outwards with respect to the tooth center plane 38. This arrangement makes it possible to absorb the inner skew on the largest pinion 61, said inner skew being most pronounced in the case of pinion arrangements having an increased number of pinions.

The hub region 20 has an axial width NB which is measured from the hub outer plane 27 as far as the hub inner plane 29. The connecting region 40 has a maximum axial width VB which is measured from the connecting outer plane 47 as far as the connecting inner plane 49. The tooth region 30 has a maximum axial width ZB which is measured from the tooth outer plane 37 as far as the tooth inner plane 39 and corresponds in this case to the tooth width Z1 of the thick tooth 32b. The axial width VB in the connecting region 40 is particularly large in order to increase the rigidity. In particular, the connecting region 40 even extends in the axial direction over the tooth inner plane 39 by the overhang extent Ü. The axial width VB in the connecting region 40 is significantly larger than the axial width NB, ZB of the hub region 20 and of the tooth region 30. At the same time, the material thickness P of the arm profile 42 in the connecting region 40 is selected to be as small as possible in order to keep the weight low. The axial offset O1 of the tooth region 30 relative to the hub region 20 is alternatively measured here from the hub outer plane 27 as far as the tooth center plane 38. The overhang Ü1 of the connecting region 40 can also be measured from the connecting inner plane 49 as far as the tooth center plane 38. The extents O1 and Ü1 are correspondingly increased by half a tooth width in comparison to the extents O and Ü.

FIGS. 10a to 10e show the sprocket 10 in various views. The hub region 20, the connecting region 40 and the tooth region 30 are lined up in a row next to one another in the radial direction. The connecting region 40 connects the hub region 20 to the tooth region 30.

At its radially inner end, the hub region 20 has an inner profile 21 for transmitting torque from the pedal crank to the sprocket 10. At the radially outer end of the chain ring 10, the tooth region 30 has a plurality of teeth 32. In the example shown, an even number of 36 teeth is arranged comprising a first group of teeth 32a and a second group of teeth 32b. The teeth 32a of the first group are narrower in the axial direction than the teeth 32b of the second group. The wide teeth 32b may be dimensioned in such a manner that they are suitable exclusively for engaging in chain outer link plate pairs 52. The narrow teeth 32a are correspondingly narrower and are therefore also suitable for engaging in inner link plate pairs 51. In embodiments having teeth 32 of differing thickness, those surfaces of the thick teeth 32b which lie furthermost on the inside in the axial direction A define the tooth inner plane 39.

The connection region 40 is formed by the arms 41. The arms 41 connect the hub region 20 to the tooth region 30. The space between the arms 41 is free of material in order to save weight. In more precise terms, the arms 41 extend between the inner ring 22 of the hub region 20 and an outer ring 31 of the tooth region 30. The arms 41 decrease from the hub region 20 towards the tooth region 30 both in width (in the axial direction) and in thickness. The inner ring 22 of the hub region 20 is arranged adjacent to the inner profile 21. The outer ring 31 of the tooth region 30 is arranged radially inside the teeth 32.

Figure 10A:
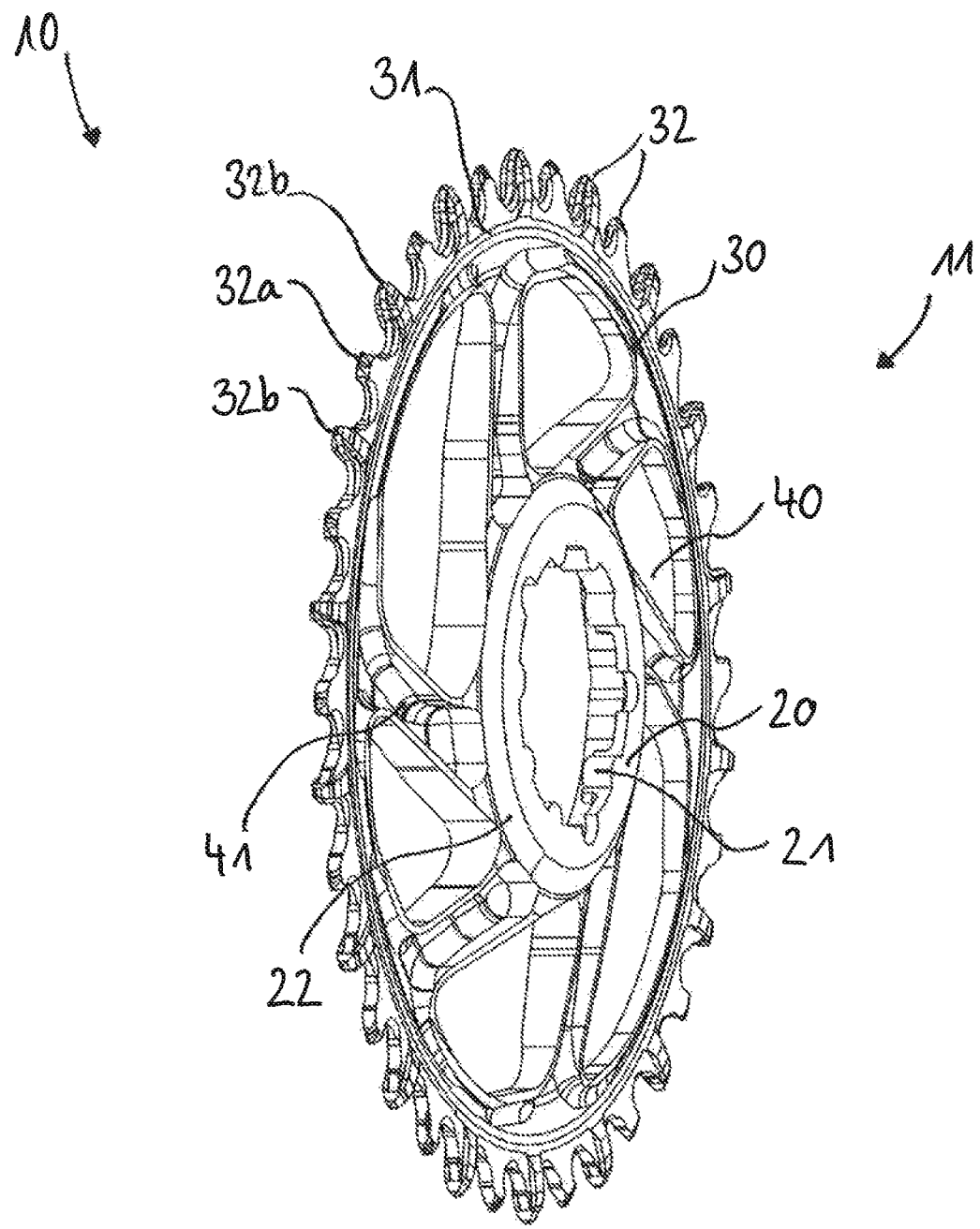
FIG. 10a shows a perspective outer view of the chain ring
Figure 10B:
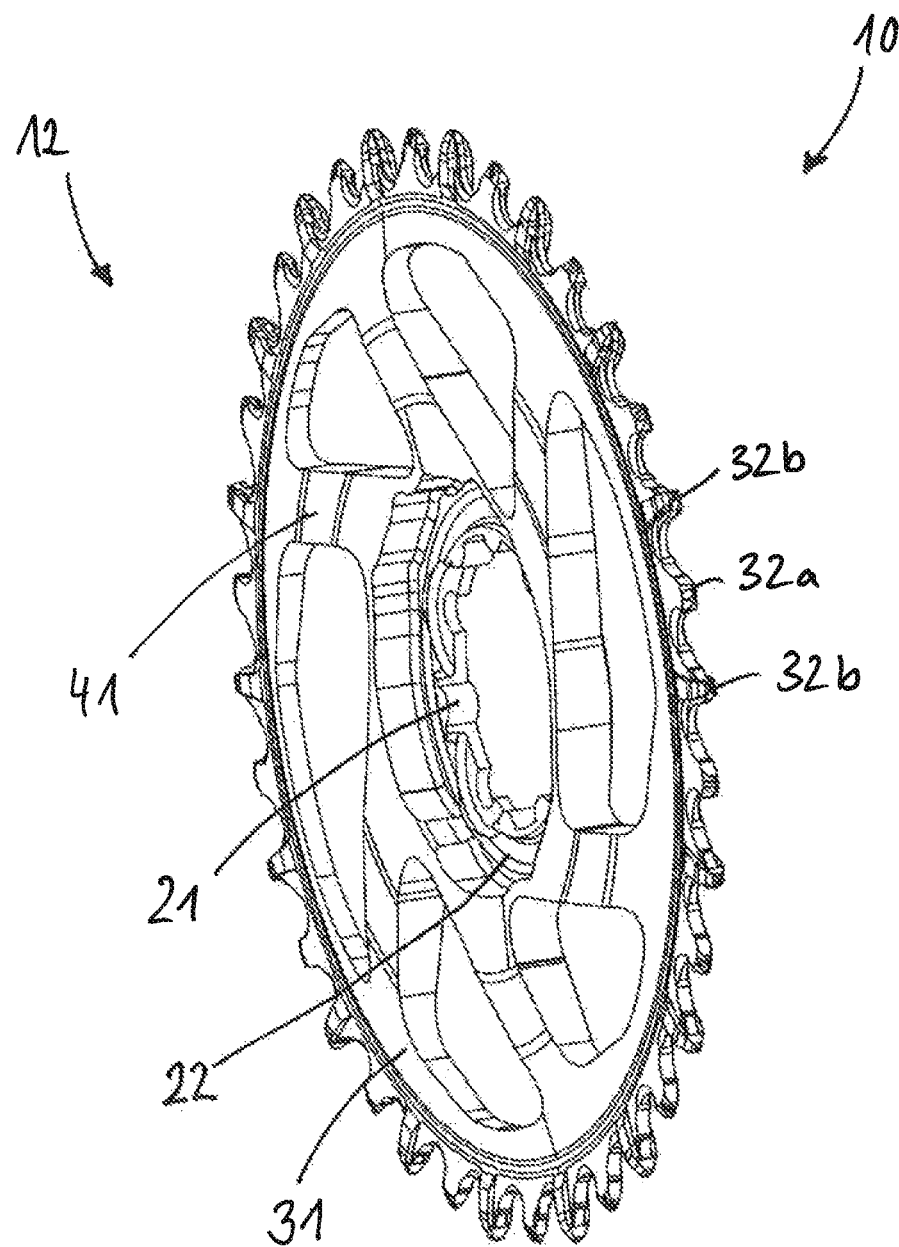
FIG. 10b shows a perspective inner view of the chain ring

In the perspective views in FIGS. 10a and 10b, the teeth 32a, 32b of differing width and the U-shaped profile of the arms 41 will become clear.

Figure 10C:
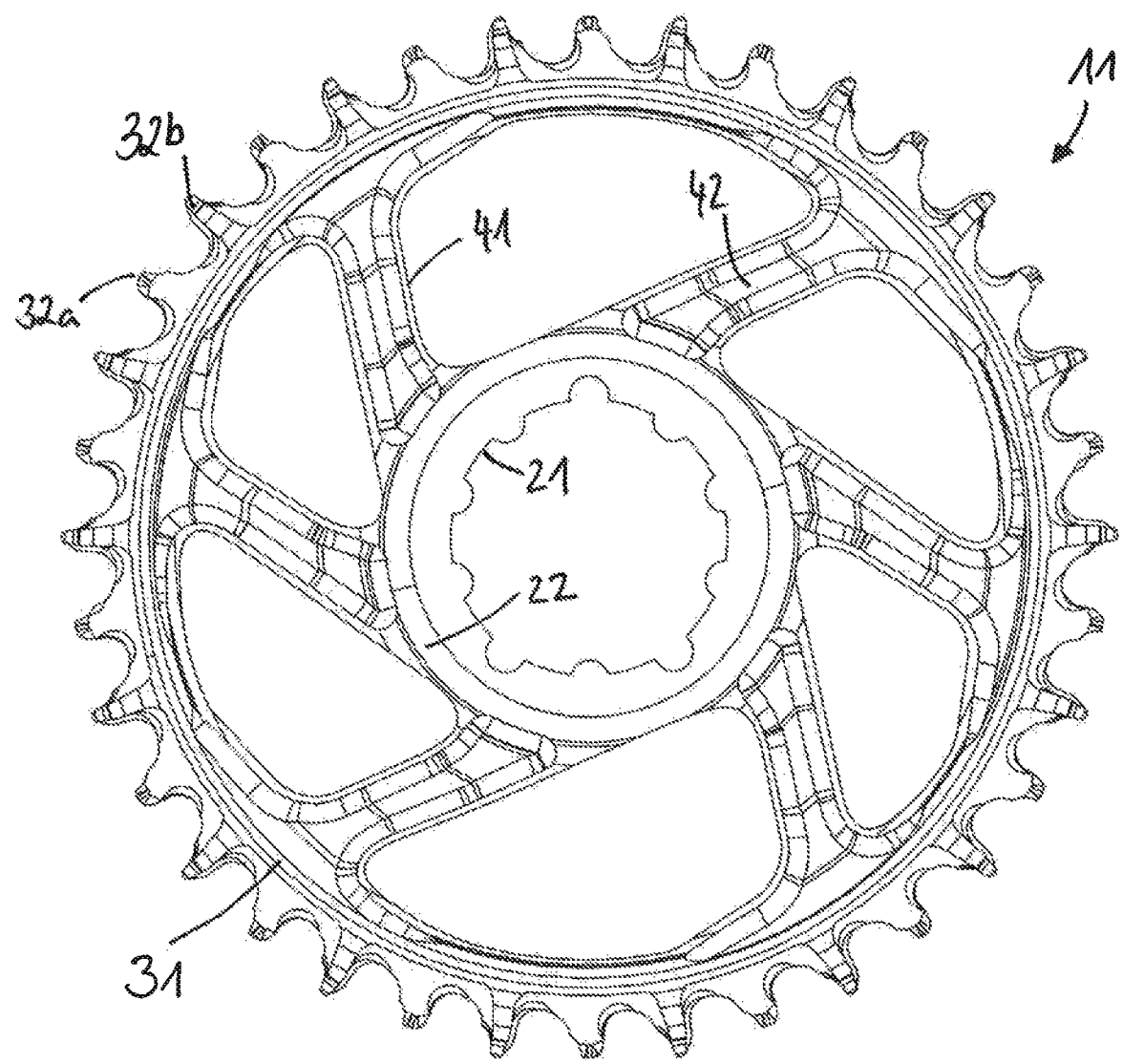
FIG. 10c shows an outer view of the chain ring
Figure 10D:
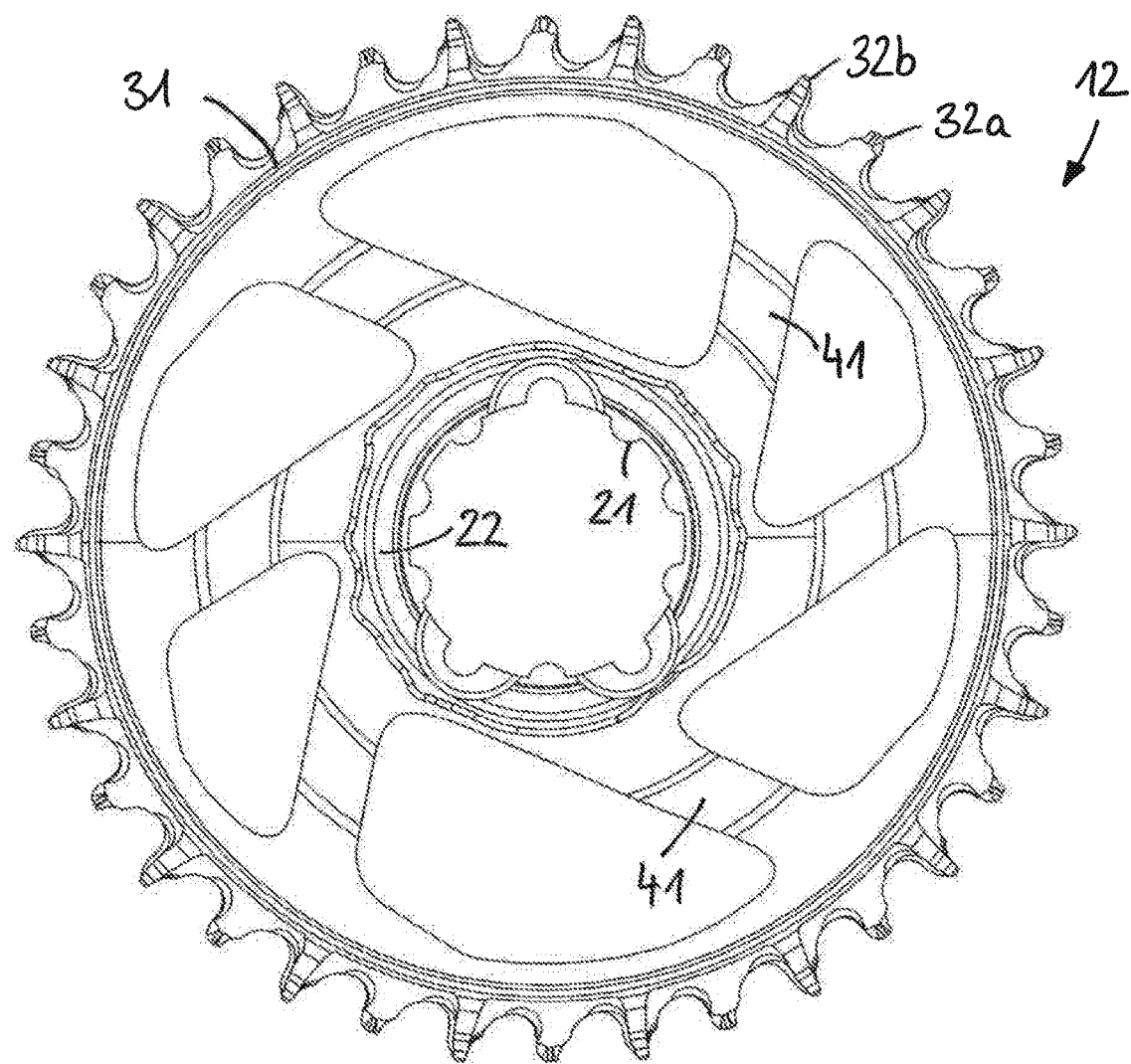
FIG. 10d shows an inner view of the chain ring
Figure 10E:
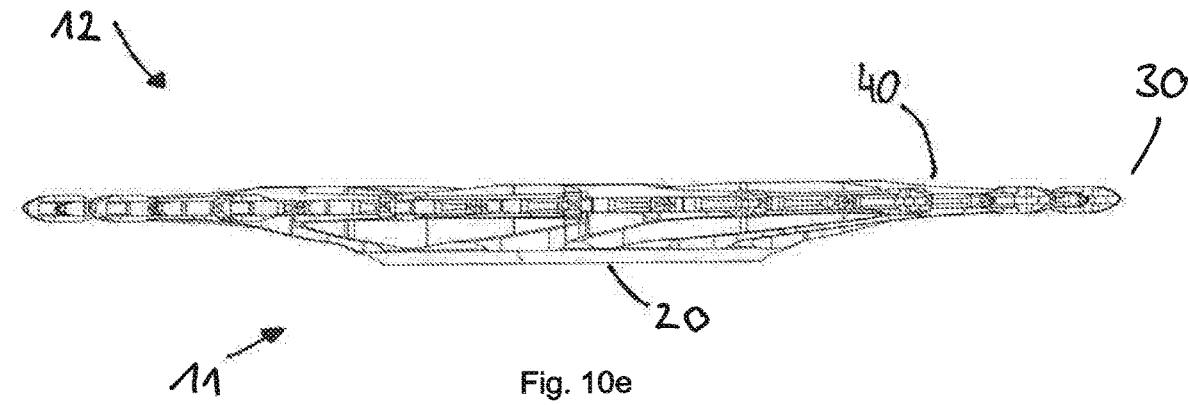
FIG. 10e shows a plan view of the chain ring

It is apparent from FIGS. 10c and 10d that the wider teeth 32b are also longer in the radial direction than the narrow teeth 32a. The teeth of the first group 32a are therefore smaller both in the axial and in the radial direction than the teeth of the second group 32b. This has a positive effect on the chain-guiding properties. FIG. 10c shows the outer side 11 of the chain ring 10 with the outwardly open U-shaped profile 42 of the six arms 41. FIG. 10d shows the inner side 12 of the chain ring 10. FIG. 10d shows a top view of the chain ring 10 with the regions 20, 30, 40.

The chain rings 10 shown here are of circular design. However, it would also be possible to design the chain ring to be, for example, oval, instead of circular. Such oval chain rings minimize the less effective regions or dead centers of the crank arrangement. The configuration, according to an embodiment, of the connecting region can also be applied to such oval chain rings in order to increase the rigidity.

Figure 11A:
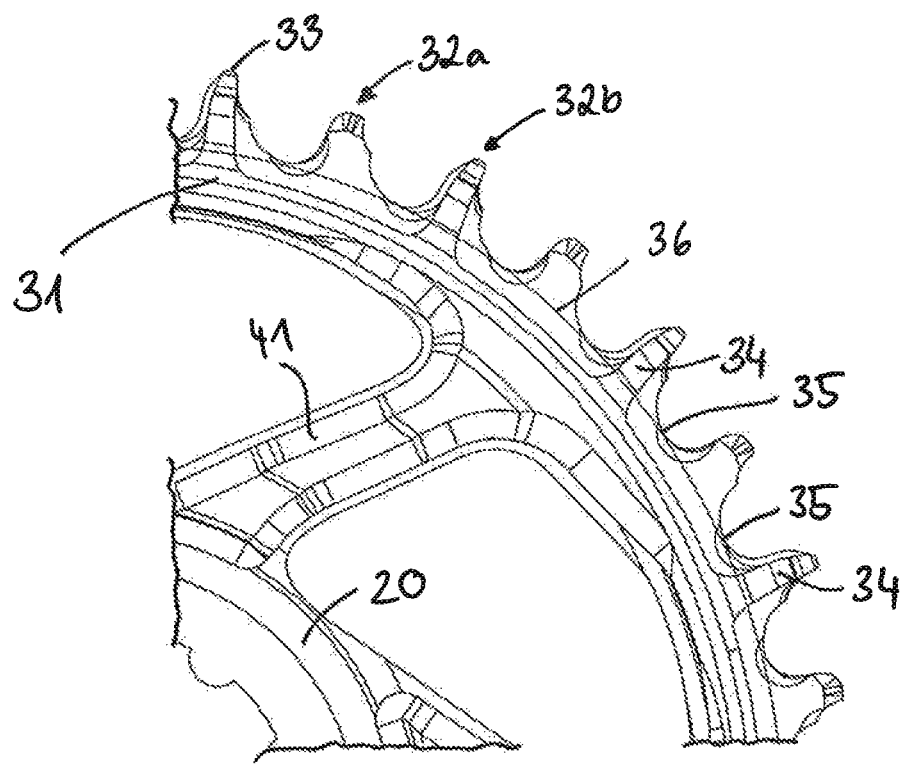
FIG. 11a shows an outer view of an enlarged partial detail of the chain ring
Figure 11B:
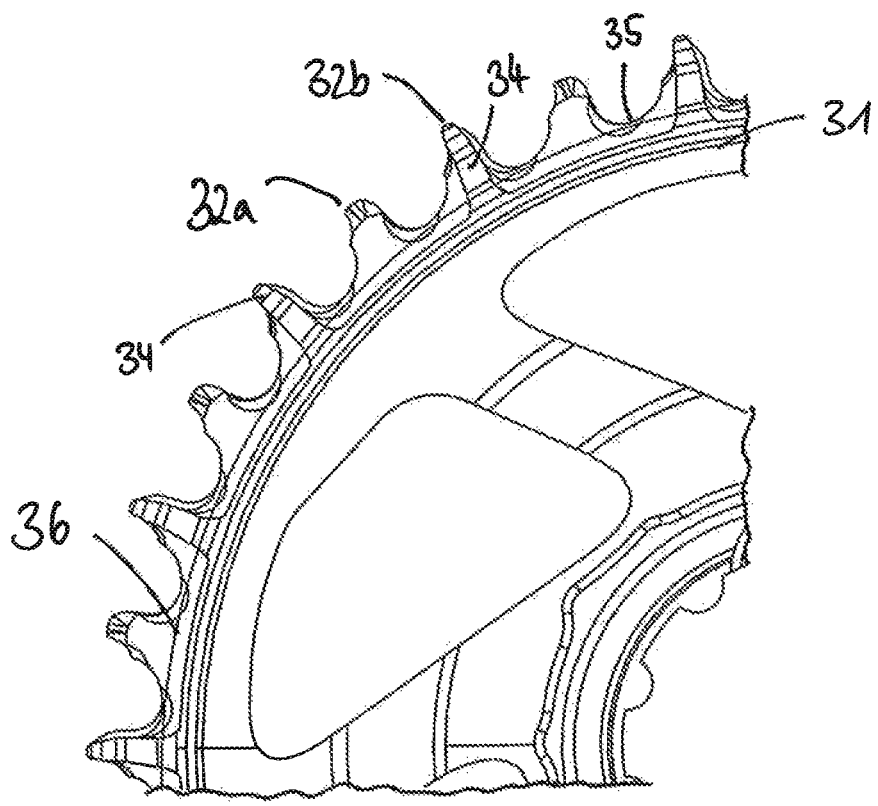
FIG. 11b shows an inner view of the enlarged partial detail

FIGS. 11a and 11b show an outer and an inner view of an enlarged detail of the chain ring 10. A tooth base 35 is arranged between two adjacent teeth 32. The root diameter 36 runs tangentially to the tooth bases 35. The thick teeth 32b of the second group of teeth have thickened portions 34. The thin teeth 32a are free from thickened portions. Said thickened portions 34 extend in the radial direction from the tooth tip 33 over the tooth root and over the root diameter 36. In other words, the thickened portions 34 of the thick teeth 32b extend in the radial direction to below the tooth base 35. Said thickened portion 34, which is significantly longer in the radial direction than known embodiments, and the material thereby obtained makes the tooth 32b more stable. As emerges from FIGS. 11a to 11b, the thickened portion 34 is formed in particular uniformly on the outer side 11 and on the inner side 12 of the sprocket 10 or of the tooth 32b and therefore extends on both sides from the tooth tip 33 to below the root diameter 36. The remaining material in the region of the teeth 32 and the outer ring 31 can be abraded, for example, by milling to the extent of the narrow teeth 32a. This further saves on weight. The sprocket 10 can be produced precisely and easily from aluminium by machining, for example by milling. The cross-sectional increase in size of the profile arms 41 in the connecting region 40 beyond the tooth inner plane 39 permits a particularly small material thickness of the profile with sufficient rigidity. The sprocket 10 is sufficiently stable and is as light in weight as possible.

The single sprocket according to the invention is suitable for mounting on a pedal crank, which is mounted rotatably about an axis of rotation, of a bicycle, and for engaging in a bicycle chain with chain inner link plate pairs and chain outer link plate pairs. The sprocket has an axial outer side and an axial inner side. Furthermore, the sprocket has a hub region with an inner profile at the radially inner end of the sprocket for transmitting torque from the pedal crank to the sprocket. The hub region defines an axial hub center plane between a hub outer plane and a hub inner plane. The sprocket furthermore has a tooth region with a plurality of teeth at a radially outer end of the sprocket for engaging in the bicycle chain.

The tooth region defines an axial tooth center plane between a tooth outer plane and a tooth inner plane. The tooth inner plane is defined by the surfaces, lying furthermost on the inside in the axial direction, of the plurality of teeth. Furthermore, the sprocket has a connecting region which extends in the radial direction between the hub region and the tooth region of the sprocket and connects said regions to each other. The connecting region defines a connecting center plane between a connecting outer plane and a connecting inner plane. The connecting inner plane is defined by the surfaces, lying furthermost on the inside in the axial direction, of the connecting region. The tooth center plane runs in a manner offset inwards in the axial direction with respect to the hub center plane, wherein, in order to increase the rigidity of the sprocket, the connecting inner plane of the connecting region runs in a manner offset inwards in the axial direction with respect to the tooth inner plane of the tooth region.

While the present invention has been described above by reference to various embodiments, it will be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A single sprocket for mounting on a pedal crank, which is mounted rotatably about an axis of rotation of a bicycle, and for engaging a bicycle chain with chain inner link plate pairs and chain outer link plate pairs, the single sprocket comprising:
    an axial outer side,
    an axial inner side,
    a hub region with an inner profile at a radially inner end of the single sprocket for transmitting torque from the pedal crank to the single sprocket, the hub region defining an axial hub center plane between a hub outer plane and a hub inner plane,
    a tooth region with a plurality of teeth at a radially outer end of the single sprocket for engaging the bicycle chain, the tooth region defining an axial tooth center plane between a tooth outer plane and a tooth inner plane, the tooth inner plane defined by surfaces lying furthermost on the inside in an axial direction of the plurality of teeth, and
    a connecting region which extends in a radial direction between the hub region and the tooth region of the single sprocket and connects said hub region and tooth region to each other, the connecting region defining a connecting center plane between a connecting outer plane and a connecting inner plane, and the connecting inner plane defined by surfaces lying furthermost on the inside in the axial direction of the connecting region,
    wherein the axial tooth center plane is offset inwards in the axial direction with respect to the axial hub center plane, and the connecting inner plane of the connecting region is offset inwards in the axial direction with respect to the tooth inner plane of the tooth region, and
    wherein the connecting region is formed at least in part by a plurality of arms extending from the hub region to the tooth region connecting said hub region and tooth region to each other, each of the plurality of arms having a thin-walled open cross section of substantially U-Shaped design, a wall thickness of which is small relative to an axial width of the connecting region.

2. The sprocket according to claim 1, wherein the plurality of arms are designed in cross section in a shape of a profile carrier.

3. The sprocket according to claim 1, wherein a U-shaped cross section of the U-shaped design is open towards the axial outer side of the single sprocket and is closed towards the axial inner side of the single sprocket.

4. The sprocket according to claim 3, wherein the plurality of teeth comprise a first group of teeth and a second group of teeth.

5. The sprocket according to claim 4, wherein the first group of teeth has a first axial width, the second group of teeth has a second axial width, and the second axial width is greater than the first axial width.

6. The sprocket according to claim 5, wherein the first axial width of the first group of teeth is smaller than a chain inner link plate spacing of a chain inner link plate pair, and the second axial width of the second group of teeth is greater than the chain inner link plate spacing and smaller than a chain outer link plate spacing of a chain outer link plate pair.

7. The sprocket according to claim 6, wherein the teeth of the second group of teeth each have an axial projection which extends in the radial direction from a tooth tip to beyond a root diameter.

8. The sprocket according to claim 7, wherein the axial projection on the teeth of the second group of teeth is in each case formed on the axial outer side and/or on the axial inner side.

9. The sprocket according to claim 4, wherein the teeth of the first group of teeth in the radial direction are shorter than the teeth of the second group.

* * * * *